2,823,260
Patented Feb. 11, 1958

United States Patent Office

2,823,260

ARRANGEMENT FOR MEASURING THE ARITHMETICAL DISTORTION OF START-STOP CODE TELEGRAPHIC SIGNALS

Maurice Karlin and Stéphane Jean De Vleminck, Brussels, Belgium, assignors, by mesne assignments, to North American Philips Company, Inc., New York, N. Y., a corporation of Delaware Application October 24, 1955, Serial No. 542,213

Claims priority, application Netherlands October 23, 1954

6 Claims. (Cl. 178—69)

The invention relates to arrangements for measuring the arithmetical distortion of start-stop code telegraphic signals.

Arrangements for this purpose are known in which at the instants of change in polarity of the telegraph circuits an indication is given on the screen of a cathode ray tube, and in which departures from the required value can be read from a graduated scale. Thus, a visual indication only is obtained but no information about the percentage of departures which exceed a given threshold value. The arrangement in accordance with the invention permits to be obtained this information also.

In the arrangement in accordance with the invention at each change in polarity of the received signal current a pulse is supplied to the input of a gate circuit the output of which is connected to a first pulse counting circuit, and on reception of the first mark element of a telegraphic signal a pulse is supplied to a second pulse counting circuit and, in addition, a time base circuit is rendered operative which periodically for a number of times which is equal to the total number of elements of a telegraphic signal renders the gate circuit conductive for pulses for an adjustable period of time, the repetition period being equal to the duration of an element of an undistorted telegraphic signal.

Figure 1:
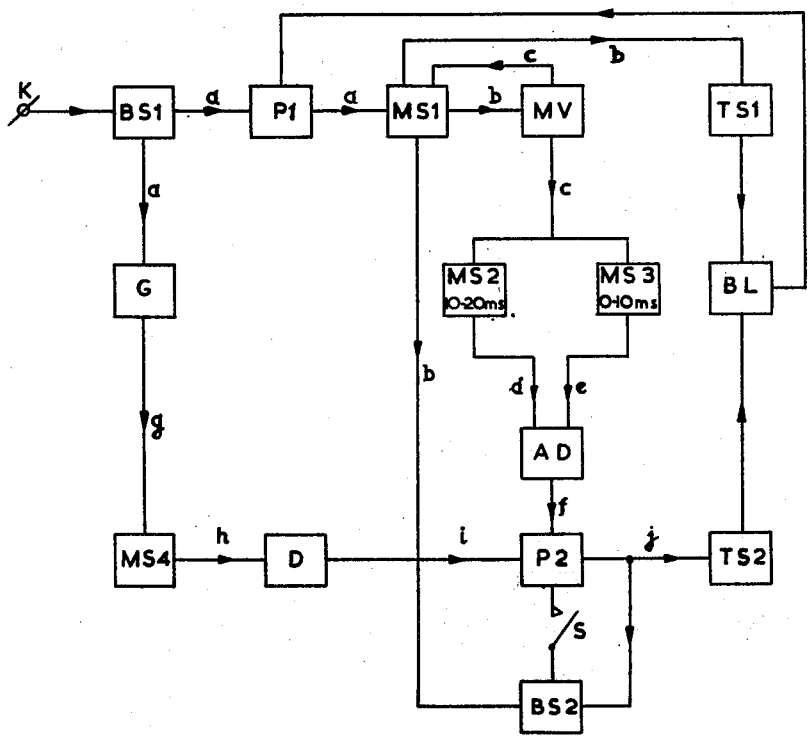
Figure 2:
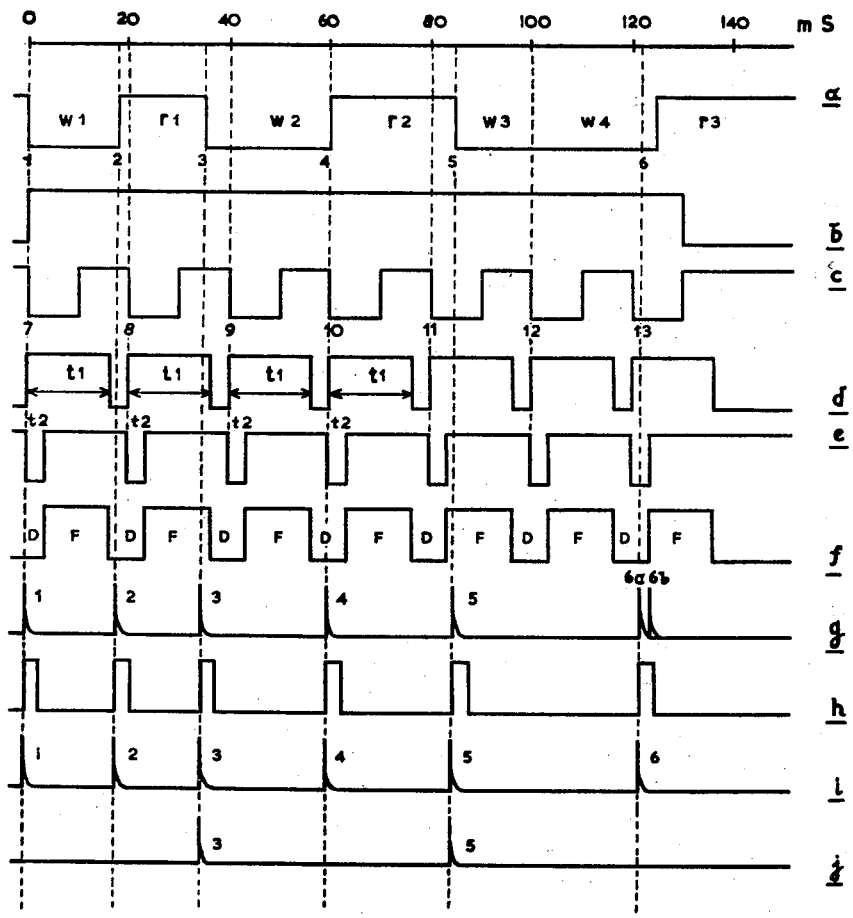

The invention will now be described more fully with reference to the drawing, in which Fig. 1 shows an embodiment of a device in accordance with the invention and Fig. 2 shows a number of signal wave-shape diagrams.

The various devices such as trigger circuits, gate circuits, counting circuits and so on which are shown in block form may be designed in known manner.

As is well-known, start-stop code telegraphic signals according to the international alphabet consist of seven elements, namely one starting element, which is a mark element, five elements the polarity of which determines the meaning of the signal, and one stop element, which is a space element. In an undistorted telegraphic signal the duration of each element is 20 millisec. at a signalling speed of 50 baud.

Fig. 2a shows an example of a distorted telegraphic signal representing the letter G. It comprises a mark element $w1$ which is the start element, a space element $r1$, a mark element $w2$, a space element $r2$, two mark elements $w3$ and $w4$, and a space element $r3$ which is the stop element. During the telegraphic signal there occur five polarity changes 2, 3, 4, 5 and 6 which should have occurred at instants 20, 40, 60, 80 and 120 millisec. resp. after the first change in polarity 1, i. e. the beginning of the telegraphic signal. However, the changes 2 and 3 are early and the changes 5 and 6 are late, whilst the change 4 occurs at the right instant. The change 6 in addition shows another distortion which consists of a number of polarity changes in rapid succession which may, for example, be due to prolonged vibration of a relay contact in the transmission channel.

The telegraphic signals to be tested are supplied through an input terminal K to a bistable trigger circuit BS1 of Fig. 1, which supplies a square wave output voltage $a$ of the kind shown in Fig. 2a to a device G and to a gate circuit P1 which normally is conductive and transmits the received pulses to a monostable trigger circuit MS1. On reception of a telegraphic signal the trigger circuit MS1 under the action of the first polarity change 1 passes from the normal position to the work position and thus supplies a voltage $b$ as shown in Fig. 2b to a multivibrator MV the natural frequency of which is 50 c./s. Consequently, a cycle is equal to the duration of an element of an undistorted signal. Owing to the voltage $b$ the multivibrator MV is rendered conductive so that it starts oscillating and supplies a square wave voltage $c$ as shown in Fig. 2c to monostable trigger circuits MS2 and MS3. The polarity changes 8, 9, 10, 11, 12 and 13 occur 20, 40, 60, 80, 100, and 120 millisec. resp. after the beginning of the telegraphic signal, i. e. at instants at which in an undistorted telegraphic signal polarity changes might occur. In addition, the multivibrator MV supplies the square wave voltage $c$ to the monostable trigger circuit MS1 the fly-back time of which slightly exceeds 130 millisec. and may, for example, be 135 millisec., so that the trigger circuit MS1 returns to the rest position after 130 millisec. due to the synchronizing effect of the voltage $c$. As a result the multivibrator MV is again cut off under the control of the voltage $b$.

Due to the polarity changes, 7, 8, 9, 10, 11, 12 and 13 the monostable trigger circuits MS2 and MS3 pass from the normal condition to the work condition, after which they automatically return to the normal condition after periods $t1$ and $t2$ respectively. The reset periods $t1$ and $t2$ of the monostable trigger circuits MS1 and MS2 are adjustable between 10 and 20 millisec. and 0 and 10 millisec. respectively. Thus, the trigger circuits MS2 and MS3 supply output voltages $d$ and $e$ as shown in Figures $2d$ and $2e$ which are superposed on one another in a device AD. The output voltage $f$ shown in Fig. $2f$ of the device AD controls a gate circuit P2. Consequently, at instants 20, 40, 60, 80, 100 and 120 millisec. after the beginning of the telegraphic signal the gate arrangement P2 is cut off, each time for a period D (Fig. $2f$) which begins $(20-t1)$ millisec. before the said instants and terminates $t2$ millisec. after these instants. Pulses which appear at the input of the gate circuit P2 within the periods D shown in Fig. $2f$ consequently cannot pass in contradistinction to pulses occurring within the periods F.

The output voltages $a$ shown in Fig. $2a$ from the bistable trigger circuit BS1 is differentiated in a device G and supplied to a full-wave rectifier, for example a Graetz arrangement, which supplies an output voltage $g$ as shown in Fig. $2g$ to a monostable trigger circuit MS4 the reset time of which is, say, 3 millisec. Under the action of the pulses 1, 2, 3, 4, 5 and $6a$, which occur at instants at which in the telegraphic signal shown in Fig. $2a$ a polarity change is produced, the trigger circuit MS4 passes from the normal condition to the work condition and returns to the normal condition after 3 millisec. whilst producing an output voltage $h$ as shown in Fig. $2h$. The pulse $6b$ of Fig. $2g$ falls within the last work period of the trigger circuit MS4 and consequently has no effect. The device D differentiates the voltage $h$ and supplies a voltage $i$ as shown in Fig. $2i$ to the input of the gate circuit P2 the output of which is connected to a counting circuit TS2. The gate circuit P2 passes the pulses 3 and 5 which fall within the periods F of Fig. $2f$ during which the gate circuit is conductive and supplies an output voltage $j$ as shown in Fig. $2j$ to the counting circuit TS2 which counts these pulses. The pulses 1, 2, 4 and 6 are not passed by the gate circuit P2. Although the pulses 2 and 6 do not occur at the required instants their deviations are smaller than the threshold values which are pre-determined by the adjustment of the monostable trigger circuits MS2 and MS3. Thus the counting circuit TS2 counts only these changes in the telegraphic signals the deviations of which exceed the pre-determined threshold values, which values may be varied as required by adjustment of the monostable trigger circuits MS2 and MS3. Thus, only those polarity changes in the telegraphic signals may, for example, be recorded which are early or late by more than a pre-determined period of time.

The output voltage *b* shown in Fig. 2*b* from the monostable trigger circuit MS1 is also supplied to a counting circuit TS1 which registers the number of received telegraphic signals. The counting circuits TS1 and TS2 are coupled to a device BL, which may comprise a thyratron, in a manner such that when one of the two counting circuits has received a pre-determined number of pulses the device BL is made operative and supplies to the gate circuit P1 a voltage such that this gate circuit is cut off and does not supply any further pulses to the monostable trigger circuit MS1. Consequently, the gate circuit P2 also remains cut off so that the counting circuits TS1 and TS2 are prevented from registering. The counting circuit TS1, may, for example, be designed such that the gate circuit P1 is cut off after the reception of 1000 telegraphic signals. The counting circuit TS2 may, for example, be adjusted such that it is cut off after 1, 10 or 100 defective polarity changes. The ratio between the numbers of pulses which are counted by the counting circuits TS2 and TS1 determines the number of defective changes in the telegraphic signals in proportion to the total number of received telegraphic signals. The mean number of polarity changes in each telegraphic signal is approximately 3. Thus, from the above-mentioned ratio the percentage of changes the deviations of which exceed a predetermined adjustable threshold value can be calculated in a simple manner.

It may be desirable to determine the number of defective telegraphic signals instead of the number of defective changes. Consequently, in this event only one defect per telegraphic signal must be counted by the counting circuit TS2 even if more deviations per signal should occur. For this purpose provision is made of a bistable trigger circuit BS2 which is controlled by the output voltage *b* of the monostable trigger circuit MS1 and the output voltage *j* of the gate circuit P2 in a manner such that the trigger circuit BS2 at the beginning of a telegraphic signal passes to one electrically stable condition and is restored to the other electrically stable condition by a pulse occurring in the voltage *j*. When a switch contact S is closed, the trigger circuit BS2 is coupled to the gate circuit P2 in a manner such that the gate circuit is always cut off in the other electrically stable condition of the trigger circuit BS2 irrespective of the voltage *f*. At the beginning of a telegraphic signal the gate circuit P2 is opened. When a defective change is received, the gate circuit P2 supplies a pulse to the counting circuit TS2, whilst the trigger circuit BS2 returns to the first electrically stable condition. Consequently the gate circuit P2 is cut off and remains cut off until the beginning of the next telegraphic signal.

The arrangement is particularly suitable for routine testing, i. e. automatic testing of a number of lines in sequence, for example during a pre-determined number of telegraphic signals, an alarm device being rendered operative whenever a pre-determined threshold value is exceeded.

What is claimed is:

1. A circuit arrangement for measuring the arithmetical distortion of start-stop coded telegraph signals in which each signal contains mark elements, comprising a gate circuit, means connected to apply an input pulse to said gate circuit at each change in polarity of said telegraph signals, a first pulse counting circuit connected to the output of said gate circuit, a second pulse counting circuit connected to count the number of telegraph signals, and a time base circuit connected to be rendered operative by the occurrence of the first of said mark elements in a telegraph signal and adapted to periodically render said gate circuit operative for a number of times equal to the total number of elements in said telegraph signal, the individual time durations during which said gate circuit is operative being equal to the duration of an element of an undistorted telegraph signal, whereby the relative number of counts counted by said first and second counting circuits is a measure of the arithmetical distortion of said telegraph signals.

2. A circuit as claimed in claim 1, including a second gate circuit connected to stop said counting circuits from counting after one of said counting circuits has registered a predetermined number of counts.

3. A circuit as claimed in claim 1, in which said time base circuit comprises means for individually varying the time occurrences of the beginning and the terminating of the periodic operating time periods of said gate circuit.

4. A circuit as claimed in claim 3, in which said time base circuit comprises a multivibrator for producing a square wave having a period equal to the duration of an element of an undistorted telegraph signal, and two monostable trigger circuits connected to be actuated by said multivibrator, each of said trigger circuits having an individually adjustable re-set period, means for combining the output signals of said trigger circuits, and means for applying the combined said output signals to said gate circuit for periodically rendering said gate circuit operative.

5. A circuit as claimed in claim 1, in which said means to apply an input pulse to said gate circuit comprises a monostable trigger circuit which produces an output pulse upon receipt of an input pulse and which is unresponsive to further input pulses for a predetermined period of time.

6. A circuit as claimed in claim 1, including a bistable trigger circuit connected to control said gate circuit and having a first stable condition at which said gate circuit is operative and a second stable condition at which said gate circuit is rendered inoperative, means connected to place said bistable trigger circuit in said first stable condition at the beginning of a telegraph signal, and means connected to place said bistable trigger circuit in said second stable condition when a pulse occurs at the output of said gate circuit.

References Cited in the file of this patent

UNITED STATES PATENTS 2,482,932    Pyatt et al. _____ Sept. 27, 1949

U. S. DEPARTMENT OF COMMERCE
UNITED STATES PATENT OFFICE

CERTIFICATE OF CORRECTION

Patent No. 2,823,260                                                February 11, 1958

Maurice Karlin et al.

It is hereby certified that error appears in the above numbered patent requiring correction and that the said Letters Patent should read as corrected below.

In the heading to the drawings, sheets 1 and 2, lines 2 and 3 in each occurrence, and in the heading to the printed specification, lines 2, 3, and 4, title of invention, for "ARRANGEMENT FOR MEASURING THE ARITHMETICAL DISTORTION OF START-STOP CODE TELEGRAPHIC SIGNALS" read -- ARRANGEMENT FOR MEASURING THE ARHYTHMICAL DISTORTION OF START-STOP CODE TELEGRAPHIC SIGNALS --; column 1, line 18, and column 4, lines 6 and 7, and line 23, for "arithmetical distortion" read -- arhythmical distortion --, in each occurrence.

Signed and sealed this 18th day of March 1958.

(SEAL)
Attest:

KARL H. AXLINE
Attesting Officer

ROBERT C. WATSON
                                                                                         Commissioner of Patents